US009378260B2

(12) United States Patent
Haeske et al.

(10) Patent No.: US 9,378,260 B2
(45) Date of Patent: Jun. 28, 2016

(54) METHODS AND APPARATUS FOR SYNCHRONIZING CLOSED HETEROGENOUS SYSTEMS

(71) Applicant: Lockheed Martin Corporation, Bethesda, MD (US)

(72) Inventors: David Haeske, Saint Cloud, FL (US); Robert K. Hollister, Orlando, FL (US); Joshua Hornsby, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/478,097

(22) Filed: Sep. 5, 2014

(65) Prior Publication Data

US 2014/0379653 A1 Dec. 25, 2014

Related U.S. Application Data

(63) Continuation of application No. 13/314,716, filed on Dec. 8, 2011, now Pat. No. 8,880,464.

(51) Int. Cl.

| G06F 7/00 | (2006.01) |
|---|---|
| G06F 17/00 | (2006.01) |
| G06F 17/30 | (2006.01) |
| G06F 9/445 | (2006.01) |
| G06F 15/16 | (2006.01) |

(52) U.S. Cl.
CPC ............ G06F 17/30575 (2013.01); G06F 8/65 (2013.01); G06F 17/30174 (2013.01); G06F 17/30179 (2013.01); G06F 17/30227 (2013.01)

(58) Field of Classification Search
CPC ... G06F 8/65; G06F 17/30575; G06F 17/30227
USPC .................................. 717/170; 707/615, 634
See application file for complete search history.

(56) References Cited

U.S. PATENT DOCUMENTS

| 6,058,250 A * | 5/2000 | Harwood et al. .......... 705/26.35 |
| 8,380,840 B2 * | 2/2013 | Vijay ............................ 709/224 |
| 2004/0139308 A1 * | 7/2004 | Foster et al. ....................... 713/1 |
| 2006/0064362 A1 * | 3/2006 | Politi et al. ...................... 705/26 |
| 2006/0294140 A1 * | 12/2006 | Schemionek et al. . 707/999.107 |

(Continued)

OTHER PUBLICATIONS

The MathWorks, Using Matlab Graphics, Version 5, Dec. 1996, Title Page, Preface and Chapter 8.*

(Continued)

*Primary Examiner* — Usmaan Saeed
*Assistant Examiner* — Brian E. Weinrich
(74) *Attorney, Agent, or Firm* — Withrow & Terranova, PLLC

(57) ABSTRACT

Methods, systems, and computer program products for synchronizing a first closed system with a second closed system are disclosed. A first transaction synchronization function on a first computing device receives a first plurality of user transactions and stores corresponding transaction records in a first synchronization file in a common format. The first transaction synchronization function submits the first plurality of user transactions to the first closed system via a first vendor interface for application to a first database. A second computing device accesses the first synchronization file, translates the transaction records in accordance with a second vendor interface, and submits the translated transaction records to a second closed system via a second vendor interface for application to a second closed system.

10 Claims, 7 Drawing Sheets

(56) References Cited

U.S. PATENT DOCUMENTS

| | | | |
|---|---|---|---|
| 2009/0077549 A1* | 3/2009 | Sadja et al. | 717/178 |
| 2010/0263036 A1 | 10/2010 | Mondal | |
| 2011/0145807 A1* | 6/2011 | Molinie et al. | 717/170 |
| 2013/0066901 A1* | 3/2013 | Marcelais et al. | 707/769 |
| 2013/0139139 A1* | 5/2013 | Mallur et al. | 717/170 |

OTHER PUBLICATIONS

Non-Final Office Action for U.S. Appl. No. 13/314,716, mailed Dec. 4, 2013, 27 pages.

Final Office Action for U.S. Appl. No. 13/314,716, mailed May 29, 2014, 31 pages.

Notice of Allowance and Interview Summary for U.S. Appl. No. 13/314,716, mailed Aug. 11, 2014, 15 pages.

\* cited by examiner

METHODS AND APPARATUS FOR SYNCHRONIZING CLOSED HETEROGENOUS SYSTEMS

RELATED APPLICATIONS

This application is a continuation of co-pending U.S. patent application Ser. No. 13/314,716, filed on Dec. 8, 2011, entitled METHODS AND APPARATUS FOR SYNCHRONIZING CLOSED HETEROGENOUS SYSTEMS, which is hereby incorporated herein by reference in its entirety.

FIELD OF THE DISCLOSURE

The present disclosure relates to synchronization of systems, and in particular to synchronization of a first closed system with a second closed system.

BACKGROUND

Organizations, such as private companies or governmental agencies, commonly purchase relatively complex third-party products that help them achieve their primary goals. For example, a company that manufactures and markets electronic products may need a third-party human resources product to help the company manage its employees, a third-party supply chain product to help the company manufacture its products, a third-party customer relationship product to help maintain relationships with customers, and the like. Generally, such third-party products provide the desired functionality, and manage large amounts of data that are relevant to such desired functionality. Management of data is in itself a highly complex function, and third-party products frequently incorporate a database management system (DBMS) that is manufactured by yet another party that specializes in the management of data. A DBMS is commonly a combination of complex database access routines that manipulate data structures, and the actual data structures (i.e., the "database") manipulated by the database access routines.

Typically, a third-party product interfaces with a DBMS through a programmatic interface that is native, or unique, to that DBMS vendor. Such native database interface allows the third-party product to store, retrieve, and modify data necessary to the functionality of the third-party product, in a manner dictated by the DBMS vendor.

Third-party products typically provide user interface functions that allow employees of the company to enter, retrieve, and modify data maintained by the third-party product. Often a third-party product will also provide a programmatic interface, such as an application programming interface (API), that allows a company that has purchased the third-party product to develop software that can interface with the third-party product programmatically to enter, retrieve and modify data. Consequently, the company may have no ability to directly access the underlying DBMS used by the third-party product, and thus, with respect to the underlying DBMS system, may be limited to the functionality implemented by the third-party vendor. If the company would like additional access to the underlying DBMS, the company must request the third-party vendor to implement such functionality, which may or may not be feasible, and even if feasible, may not be implemented in a timely manner by the third party. Such a third-party product will be referred to herein as a "closed system," since the company using the third-party product has no, or only limited, ability to modify the third-party product, and does not have direct access to the underlying DBMS.

Such closed systems can make data synchronization with other systems difficult, or impracticable. It is not uncommon for a company, over time, to develop multiple systems that rely on the same data, requiring propagation of data from one system to another system. This can happen, for example, as a company grows and purchases other companies, which have in place their own third-party products, e.g., a customer relationship management (CRM) product, that differ from the systems of the purchasing company. It may be highly desirable to keep the two different CRM systems in synchronization with one another, but this may not be possible because the systems may be provided by two different vendors, even where such vendors utilize the same underlying DBMS system.

In some situations, an organization may implement multiple instances of the same third-party product throughout the organization, but desire synchronization among such instances, or desire synchronization of modifications made by client instances with a master instance. Again, such synchronization functionality, if not expressly provided by the third-party vendor, may not be possible. Accordingly, there is a need for a mechanism that allows synchronization among closed systems, and that does not require modification of a closed system, or direct access to an underlying DBMS used by the closed system.

SUMMARY

Embodiments disclosed herein relate to synchronization of closed systems. In one embodiment, a first closed system includes a first vendor interface, a first native database interface, and a first database. A second closed system includes a second vendor interface, a second native database interface, and a second database. Both closed systems are configured to submit transactions received via the respective vendor interfaces to the respective native database interfaces for application to the respective databases.

A first transaction synchronization function executing on a first computing device receives a first plurality of user transactions. Each of the user transactions identifies a user action and data that identifies a desired modification to the first database. The first transaction synchronization function stores the first plurality of user transactions in a first synchronization file in a common format.

The first transaction synchronization function also submits the first plurality of user transactions to the first closed system via the first vendor interface for application to the first database.

A second transaction synchronization function accesses the first synchronization file, translates the user transactions from the common format to a vendor format suitable for submission to the second vendor interface, and submits the translated user transactions to the second closed system via the second vendor interface for application to the second database. In one embodiment, the first vendor interface differs from the second vendor interface. In this manner, embodiments disclosed herein synchronize data among closed systems without modification of the closed systems.

In one embodiment, a plurality of closed system instances is provided on a plurality of client computing devices. Each of the closed system instances includes a vendor interface, a native database interface, and a database. Each of the client computing devices includes a transaction synchronization function that stores in a respective synchronization file user transactions that identify a user action and data that identifies an intended modification to the respective database. The transaction synchronization functions also submit the user transactions to the respective closed systems for application to the respective databases via the respective vendor interfaces. The client computing devices may be isolated and not communicatively coupled to a master computing device. The respective synchronization files may be stored on portable media, such as flash drives, and transported to the master computing device for synchronization with a master closed system. The master closed system includes a master vendor interface, a master native database interface, and a master database. Each of the user transactions in the synchronization files are in the common format, irrespective of the particular vendor interface associated with the closed system to which the user transactions were initially submitted. A transaction synchronization function on the master computing device accesses the synchronization files, translates the user transactions from the common format into a format suitable for the master vendor interface, and submits the user transactions to the master vendor interface for application to the master database.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments disclosed herein relate to synchronization of closed systems without modification to the closed systems. Closed systems comprise systems that provide a primary functionality and utilize a database management system (DBMS) to store, maintain, and otherwise manage data. A closed system includes a vendor interface, a native database interface, and a database. A closed system is configured to submit a transaction received via the vendor interface to the native database interface for application to the database. The native database interface and the database may be components that are included in the closed system but that are manufactured by an entity that differs from the entity that provides the closed system. Access to the closed system, other than via the vendor interface, may be precluded.

Figure 1:
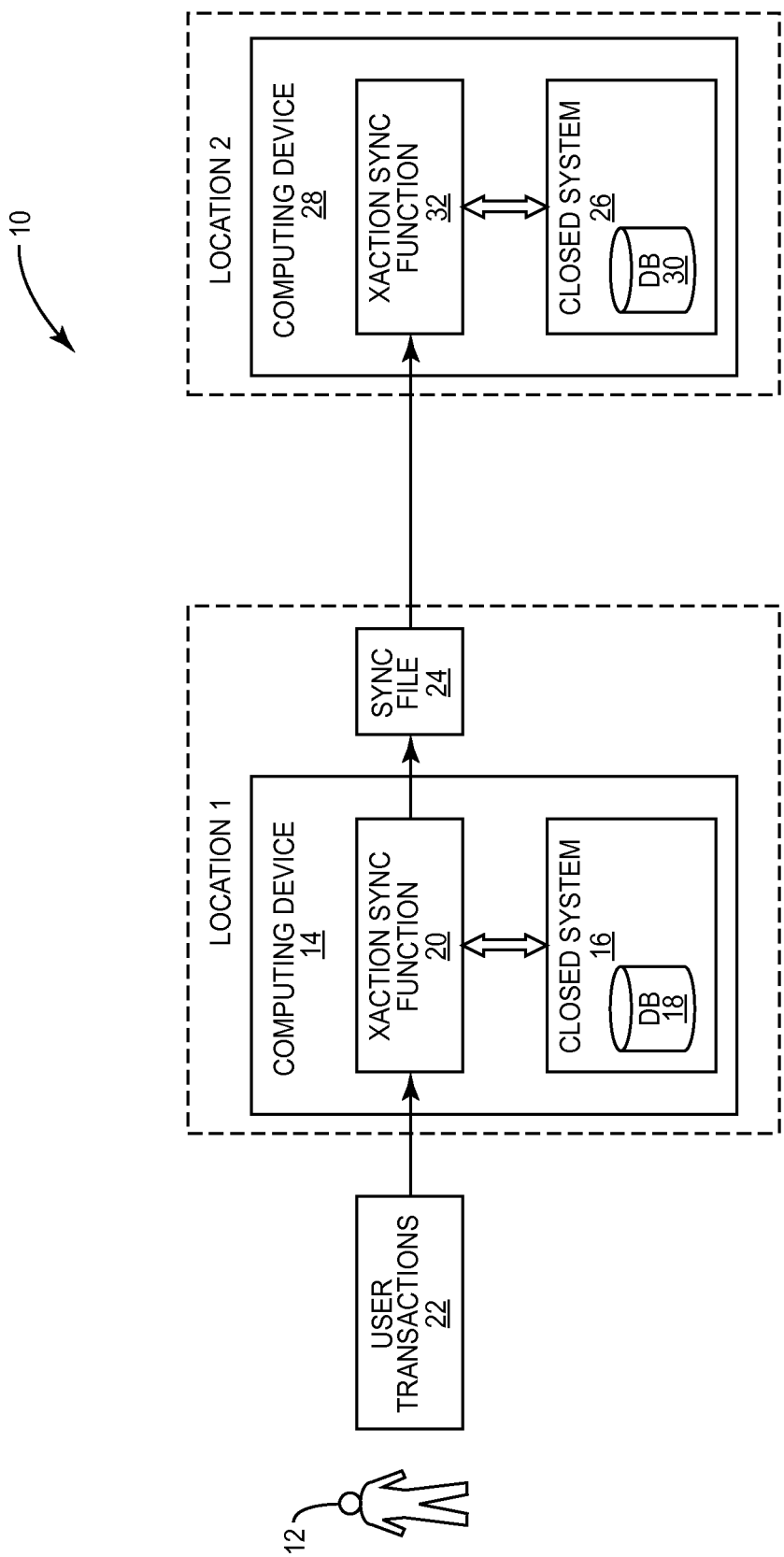
FIG. 1 is a block diagram of a system that includes closed systems in which embodiments disclosed herein may be practiced.
Figure 2:
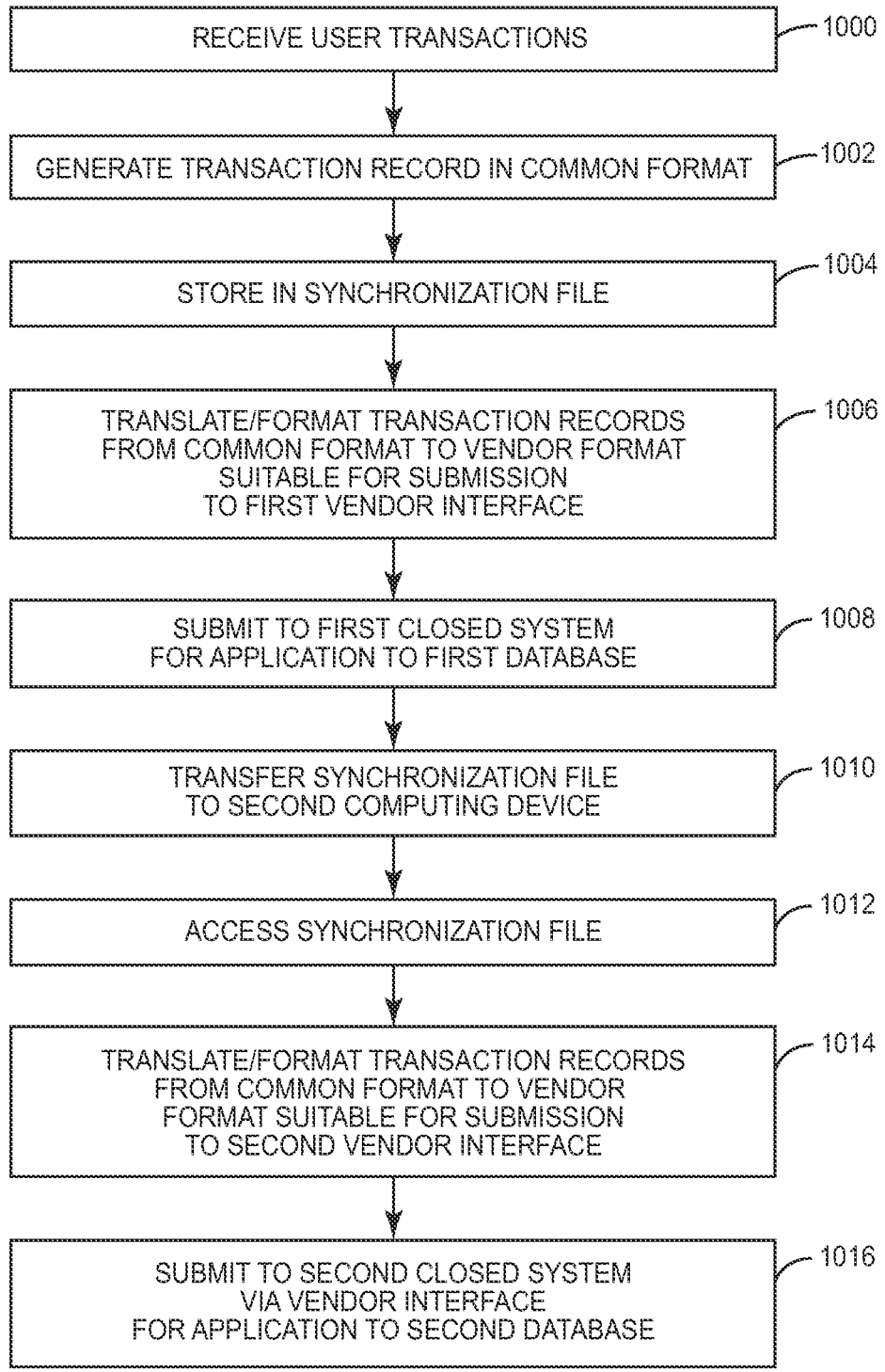
FIG. 2 is a flowchart illustrating a method for synchronizing the first closed system with the second closed system illustrated in FIG. 1, according to one embodiment.

FIG. 1 is a block diagram of a system 10 that includes closed systems in which embodiments disclosed herein may be practiced. FIG. 2 is a flowchart illustrating a method for synchronizing the closed systems illustrated in FIG. 1, according to one embodiment. FIGS. 1 and 2 will be discussed in conjunction with one another. Initially, assume that a user 12 interacts with a first computing device 14 that contains, or is coupled to, a first closed system 16 that provides a desired function to the user 12. The first closed system 16 may comprise a third-party software product, such as a logistics product, a supply management product, a human resources product, a simulation product, or the like. The first closed system 16 contains a first database 18 used by the first closed system 16 to maintain data used in providing the functionality associated with the first closed system 16. Access to the first database 18, other than via the first closed system 16, may be precluded.

The first closed system 16 may be provided to the user 12 in a manner that precludes any entity other than the vendor that manufactures the first closed system 16 from modifying the first closed system 16, or otherwise accessing the first database 18. For example, the first closed system 16 may be sold or otherwise licensed in object code only (OCO) form. The first closed system 16 offers a first vendor interface, however, that enables automated, such as programmatic, interaction with the first closed system 16, including the submission of user transactions for application to the first database 18. The first vendor interface may comprise any conventional interface that permits programmatic interaction with a software module, such as an application programming interface (API).

The first computing device 14 includes a first transaction synchronization function 20 that interacts with the first closed system 16 via the first vendor interface. The first transaction synchronization function 20 also interacts with, or includes, a user interface (not illustrated) that allows the user 12 to interact with the first transaction synchronization function 20, and through the first transaction synchronization function 20, with the first closed system 16. Such interactions may include the retrieval of data from the first database 18, modification of existing data in the first database 18, or addition of new data in the first database 18. Note that throughout the Figures, the term "transaction" may be shortened to "xaction," and the term "synchronization" to "sync."

Assume that over a period of time the first computing device 14 receives a plurality of user transactions 22 from the user 12 (FIG. 2, step 1000). Each of the user transactions 22 contains an intended, or desired, modification to the first database 18. For each user transaction 22, the first transaction synchronization function 20 generates a transaction record in a common format (FIG. 2, step 1002). The transaction record contains information associated with the submission of the user 12, such as the data that is to be updated; the desired action, such as create, modify, or delete; or the like. The common format is independent of a vendor interface of the first closed system 16 and a native database interface of the first database 18. The common format may be any suitable format that enables another translation synchronization function to recreate the user transaction, as discussed in greater detail herein, for submission to another closed system. In one embodiment, the common format utilizes Extensible Markup Language (XML).

The first transaction synchronization function 20 stores each transaction record into a synchronization file 24 (FIG. 2, step 1004). The first transaction synchronization function 20 also formats each user transaction 22 for submission to the first closed system 16 in accordance with the first vendor interface (FIG. 2, step 1006). The first transaction synchronization function 20 then submits the user transaction 22 to the first closed system 16 for application to the first database 18. It should be apparent that certain steps discussed herein could be done in a different sequence without altering the outcome of the process. For example, the first transaction synchronization function 20 could first submit the user transaction 22 to the first closed system 16, and then generate and store the transaction record in the synchronization file 24.

At a point in time, it may be desirable to synchronize the first closed system 16 with a second closed system 26. The second closed system 26 may execute on, or be coupled to, a second computing device 28. The second closed system 26 contains a second database 30, and offers a second vendor interface that permits automated communications with other modules, such as a second transaction synchronization function 32. The second closed system 26 may be a copy of, i.e., an instance of, the first closed system 16, or may be a completely different closed system from the first closed system 16. Consequently, the second vendor interface may be identical to the first vendor interface, or may be a completely different vendor interface. Assume for purposes of illustration that the second closed system 26 is a different closed system from the first closed system 16, and thus, that the second vendor interface differs from the first vendor interface. Such a situation may arise, for example, when two different closed systems that provide different primary functionality to an organization rely on certain common data, such that the two different closed systems contain copies of the same data, and a modification of the data in one closed system requires synchronization of the data with the other closed system.

In one embodiment, the first computing device 14 may not be communicatively coupled to the second computing device 28, in which case the synchronization file 24 may be copied onto a portable storage medium, such as a flash drive or the like, and copied to a location accessible to the second computing device 28 (FIG. 2, step 1010). The second computing device 28 accesses the synchronization file 24 (FIG. 2, step 1012). The second transaction synchronization function 32 translates each transaction record in the synchronization file 24 into a vendor format suitable for submission to the second vendor interface associated with the second closed system 26 (FIG. 2, step 1014). The second transaction synchronization function 32 submits the translated transactions to the second closed system 26 (FIG. 2, step 1016).

It should be apparent that the mirror image of the process described above may also be performed to synchronize updates made to the second closed system 26 with the first closed system 16. In particular, as one or more users enter transactions to the second transaction synchronization function 32, the second transaction synchronization function 32 generates transaction records, and stores such transaction records into a second synchronization file (not illustrated). The second transaction synchronization function 32 also formats such transactions in a vendor format that is suitable for submission to the second vendor interface, and submits the transactions to the second closed system 26. The second synchronization file may then be made accessible to the first computing device 14. The first transaction synchronization function 20 accesses the second synchronization file and translates each transaction record in the second synchronization file into a vendor format suitable for submission to the first vendor interface associated with the first closed system 16. The first transaction synchronization function 20 then submits the translated transactions to the first closed system 16, thereby synchronizing the first closed system 16 with the second closed system 26.

Figure 3:
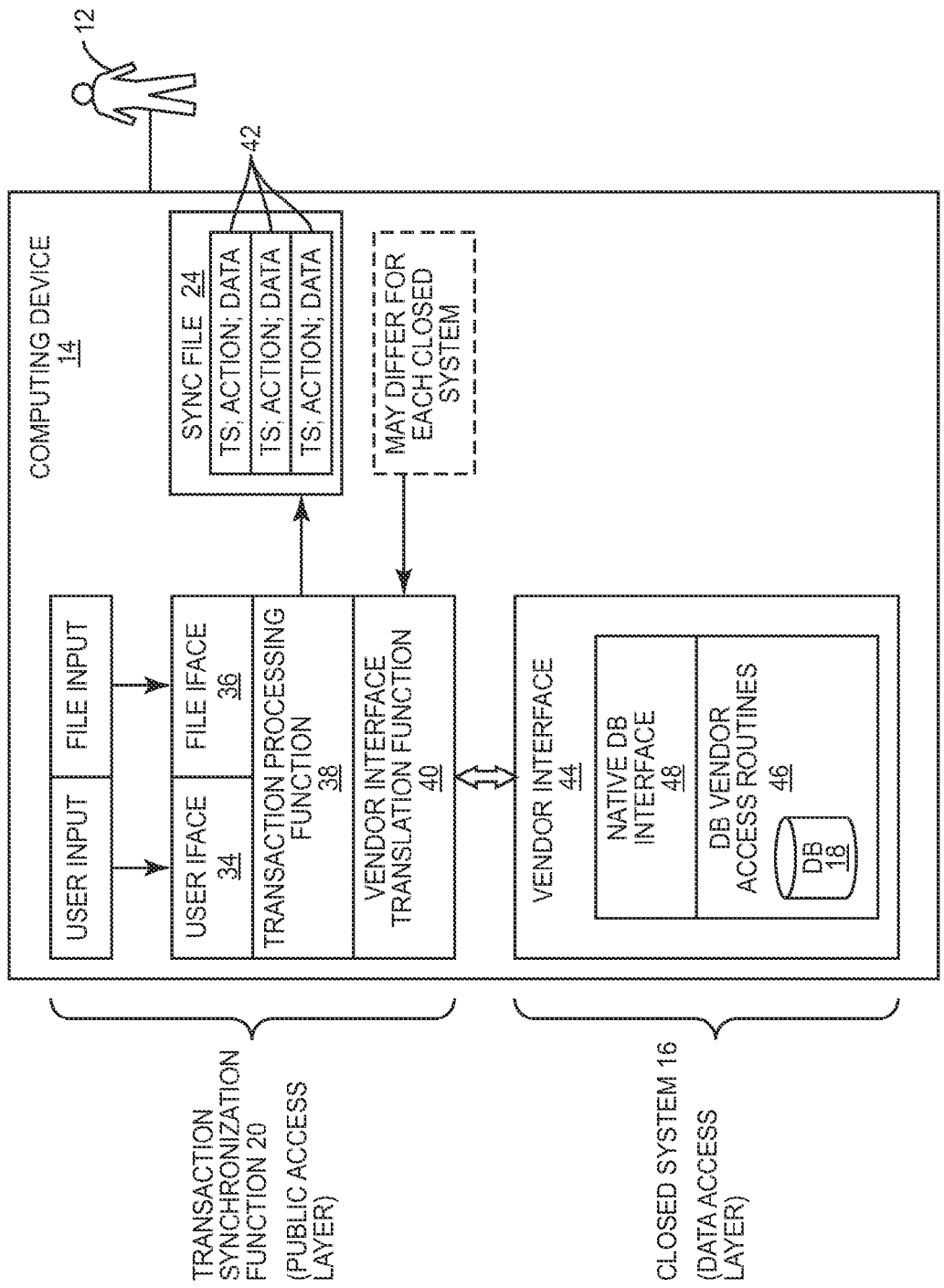
FIG. 3 is a block diagram that illustrates one of the computing devices illustrated in FIG. 1 in greater detail.

FIG. 3 is a block diagram that illustrates the first computing device 14 illustrated in FIG. 1 in greater detail. The first computing device 14 includes the first transaction synchronization function 20 and the first closed system 16. For purposes of illustration, the first transaction synchronization function 20 is further depicted in several functional blocks, such as a user interface 34, a file interface 36, a transaction processing function 38, and a vendor interface translation function 40; however, it should be apparent that the functionality provided by the first transaction synchronization function 20, as discussed herein, could be integrated or separated into any number of modules as desired. Note that throughout the Figures the term "interface" may be shortened to "iface." The user interface 34 is used by the user 12 to interact with the first closed system 16, e.g., to view or modify data contained in the first database 18. In one embodiment, the user interface 34 may provide a common and consistent user interface to users of an organization irrespective of the underlying closed system. In particular, an organization that uses a variety of different closed systems that provide identical, or similar, functionality may decide that it is desirable for its employees to access the different closed systems using a consistent user interface, to reduce training, errors, and the like, and to generally make each underlying closed system transparent to the user. The first transaction synchronization function 20 may be said to perform at a "public access layer," and the first closed system 16 at a "data access layer," because the first transaction synchronization function 20 operates independently of a native database interface 48, and does not need access to the first closed system 16 other than via a vendor interface 44.

The file interface 36 is a module that accesses synchronization files generated by other computing devices, such as the second computing device 28 (FIG. 1), and extracts transaction records from such synchronization files ultimately for submission to the first closed system 16. In one embodiment, the file interface 36 may be initiated as one or more separate processes that process corresponding synchronization files as users, such as the user 12, continue to access the first closed system 16 via the user interface 34. This may be desirable in the context of an embodiment wherein a plurality of client computer devices, each of which has its own closed system, provides synchronization files to a master computing device that contains or is coupled to a master closed system. In such embodiment, the master computing device may initiate multiple file interfaces 36 as computing resources permit, to allow parallel submission of the transactions contained in the synchronization files of each of the plurality of client computing devices.

The transaction processing function 38 receives user transactions entered by the user 12 from the user interface 34. The user transactions contain an intended, or desired, modification to the first database 18. For each user transaction, the transaction processing function 38 generates a transaction record 42 that is in a common format. The phrase "common format" indicates a format that is independent of the underlying closed system, such as the first closed system 16. Each transaction record 42 contains information associated with the information submitted by the user 12, such as the data that is to be updated; the desired action, such as create, modify, or delete; a timestamp; or the like. Exemplary common formats of a transaction record 42 will be discussed below in greater detail. The transaction processing function 38 stores each transaction record 42 into the synchronization file 24.

The vendor interface translation function 40 translates or otherwise formats the user transaction into a format suitable for the first closed system 16. In particular, the first closed system 16 includes a vendor interface 44 that permits automated, such as programmatic, interaction with the first closed system 16. Such vendor interface 44 may be the only practical, or possible, mechanism for programmatic interaction with the first closed system 16, because as discussed above, the first closed system 16 may be provided to an organization in a form that is not modifiable or that enables an organization to determine mechanisms for interacting with the first closed system 16. In particular, the first closed system 16 may be provided in an OCO format.

The vendor interface 44 may use any known mechanism for inter-process communications, such as, for example, an API. The vendor that manufactures the first closed system 16 may document the API to enable an organization to develop the vendor interface translation function 40 to appropriately call the API. In essence, the vendor interface translation function 40 is developed to invoke the appropriate methods, or functions, suitable for providing the user transaction to the first closed system 16 to effect updating of the first closed system 16. Thus, upon receipt of a user transaction or a transaction record 42, the vendor interface translation function 40 generates the appropriate interactions, such as function calls, method calls, or the like, suitable for submitting the transaction to the first closed system 16. Note that the vendor interface translation function 40 is likely different for each closed system for which synchronization is desired.

The first closed system 16 may use a DBMS provided by another party that specializes in the management of data. Such DBMSs typically include data structures, such as the first database 18, as well as database access routines 46 that manipulate data in the first database 18. Typically, the only mechanism permitted by a DBMS manufacturer for manipulation of data in a database is via the provided database access routines, to ensure consistency, recoverability, and the like. Thus, the DBMS manufacturer also provides the native database interface 48 that allows a third party, such as the vendor of the first closed system 16, to manipulate the first database 18. Accordingly, the vendor interface 44 in turn interacts with the native database interface 48 to submit the received user transaction to the first database 18. Thus, with respect to the first database 18, the first transaction synchronization function 20 may be twice removed from the ability to directly update or otherwise modify the first database 18.

A similar process is followed when the first transaction synchronization function 20 is synchronizing transactions from a synchronization file rather than receiving user transactions from the user 12. In particular, the file interface 36 reads transaction records from a synchronization file and provides the transaction records to the transaction processing function 38, which in turn provides the transaction records to the vendor interface translation function 40 for translation and submission of the data contained therein to the first closed system 16 via the vendor interface 44.

Figure 4:
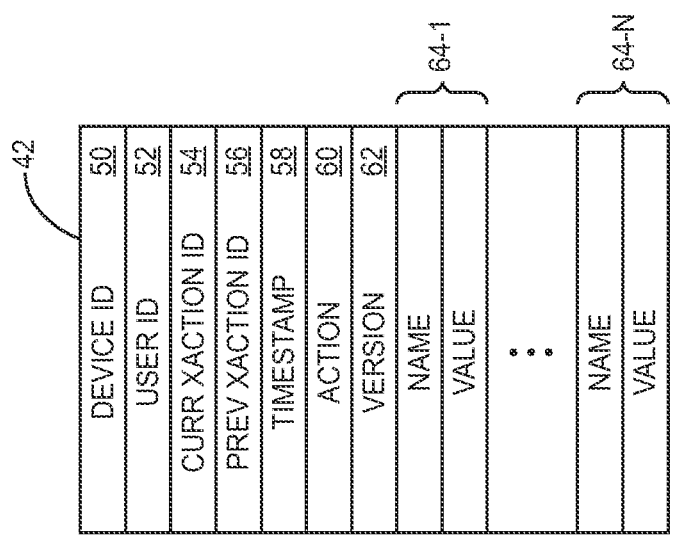
FIG. 4 is a block diagram of an exemplary common format for a transaction record.

FIG. 4 is a block diagram of an exemplary common format for a transaction record 42. The transaction record 42 may include a device identifier (ID) field 50 for uniquely identifying the computing device from which the transaction record 42 originated. A user identifier (ID) field 52 uniquely identifies the user that entered the data contained in the transaction record 42. A current (CURR) transaction (XACTION) identifier (ID) field 54 uniquely identifies the transaction record 42 from other transaction records 42. A previous (PREV) transaction (XACTION) identifier (ID) field 56 uniquely identifies the previous transaction record 42 from other transaction records 42. The PREV XACTION ID field 56 may be used, for example, by a transaction synchronization function to determine whether it has received transaction records in the proper sequence, or whether transaction records appear to be missing, which may, in one embodiment, result in an exception condition that flags a potential synchronization problem.

A timestamp field 58 may be used to identify the time the data was submitted by the user 12. The timestamp field 58 may be used, as discussed in greater detail herein, to determine the order in which transactions from different synchronization files have occurred. For example, if a transaction synchronization function is applying multiple user transactions from multiple synchronization files to a closed system, it may be desirable to submit them in the order that such updates were chronologically made in accordance with the timestamp contained in the respective timestamp fields 58. An action field 60 is used to identify the particular user action associated with the user transaction, such as delete, modify, or create. A version field 62 identifies the common format version of the common format of the transaction record 42. In one embodiment, the transaction synchronization function includes a transaction record translation function that detects the common format version identified in the version field 62, and if the identified common format version is less than a current common format version, translates the transaction record 42 from the identified common format version to the current common format version. This feature allows transaction records 42 to be synchronized even if such transaction records 42 were generated in a common format version that is not current.

A variable plurality of name/value pair fields 64-1-64-N (generally, name/value pair field 64) may follow the version field 62. Each name/value pair field 64 contains a name of a data item in the first database 18, and a value to which the data item is to be set. Preferably, each transaction record 42 only contains name/value pair fields 64 for those data fields that the user 12 has indicated are to be altered. Thus, even though the user interface 34 (FIG. 3) may display a large number of data fields and data values from the first database 18 to the user 12, if the user 12 indicates that only three of such data values are to be changed, the corresponding transaction record 42 would only contain three name/value pair fields 64. The name contained in each name/value pair field 64 has a mapping to a particular field in each closed system. In one embodiment, each transaction record 42 may also comprise a unique signature, such as a hash value, for each name/value pair 64, to ensure that the data contained in the name/value pair fields 64 has not been tampered with.

Figure 5:
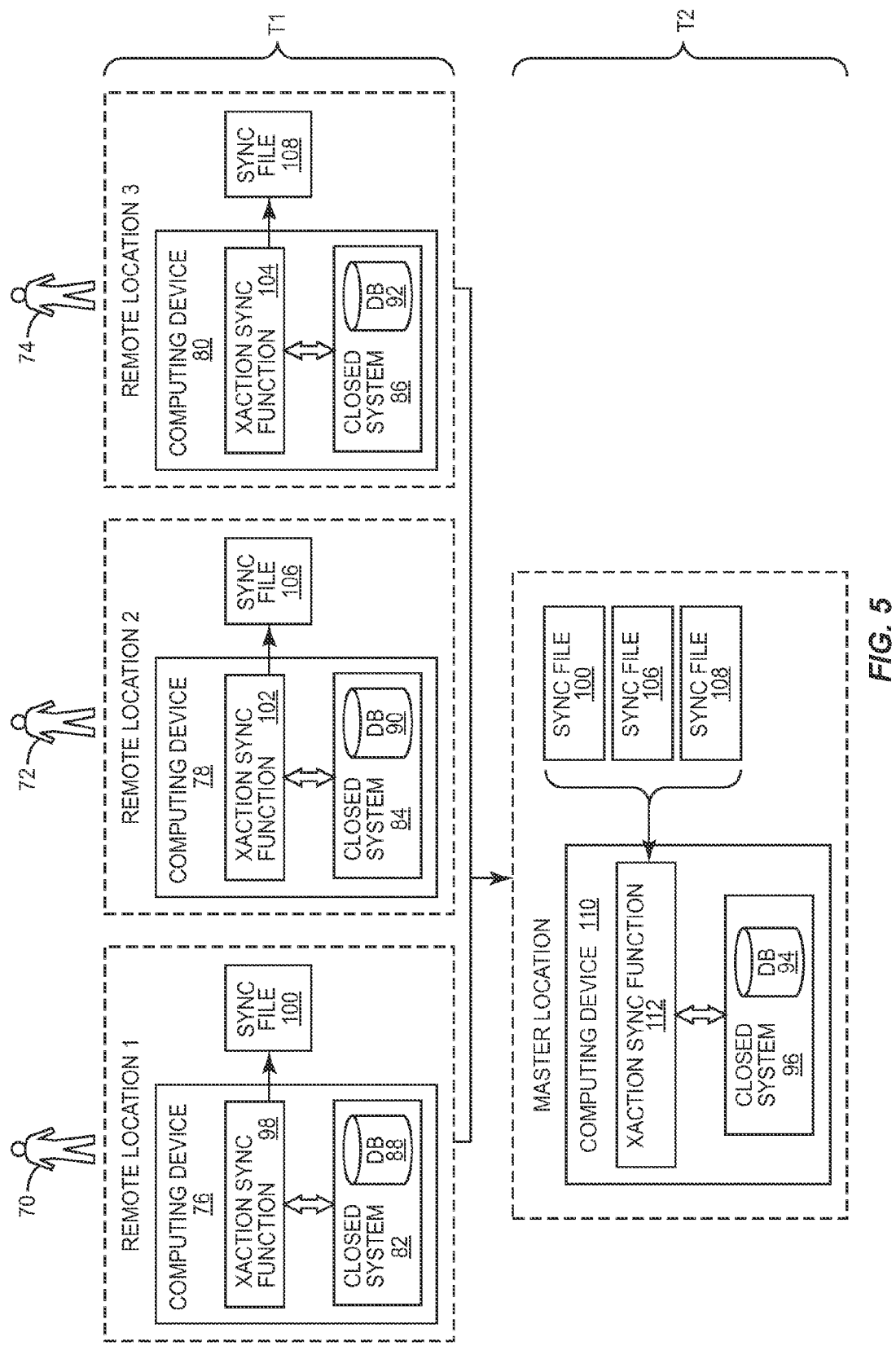
FIG. 5 is a block diagram of a system illustrating an embodiment wherein a master closed system is synchronized with updates made to a plurality of client closed systems.

FIG. 5 is a block diagram of a system illustrating an embodiment wherein a master closed system is synchronized with updates made to a plurality of client closed systems. Assume a scenario in which, at a first point in time, each of a plurality of users 70, 72, and 74 is provided with a corresponding computing device 76, 78, 80, each of which contains a closed system 82, 84, 86. At the first point in time, designated T1 in FIG. 5, databases 88, 90, and 92 are copies, or instances, of a master database 94 contained in a master closed system 96. Each of the users 70-74 may be, but are not necessarily, geographically remote from one another, and not in communication with one another, such that the computing devices 76-80 are not communicatively coupled to one another. Such a scenario may occur, for example, in a military context where the users 70-74 are in locations with little or no communication infrastructure.

Assume that over a period of time, the user 70 submits a plurality of user transactions to a transaction synchronization function 98 that executes on the computing device 76. As discussed above, for each such user transaction, the transaction synchronization function 98 generates a transaction record in the common format and stores the transaction record into a synchronization file 100. The transaction synchronization function 98 also translates or otherwise formats the user transaction into a format suitable for submission to the closed system 82, in accordance with the vendor interface of the closed system 82. The transaction synchronization function 98 then submits the user transaction to the closed system 82 via the vendor interface for application to the database 88.

Similarly, assume that users 72 and 74 also submit a plurality of transactions to the respective closed systems 84, 86 for application to the databases 90, 92. As discussed with respect to the transaction synchronization function 98, transaction synchronization functions 102, 104, generate synchronization files 106, 108 containing such transaction records in the common format.

Figure 6:
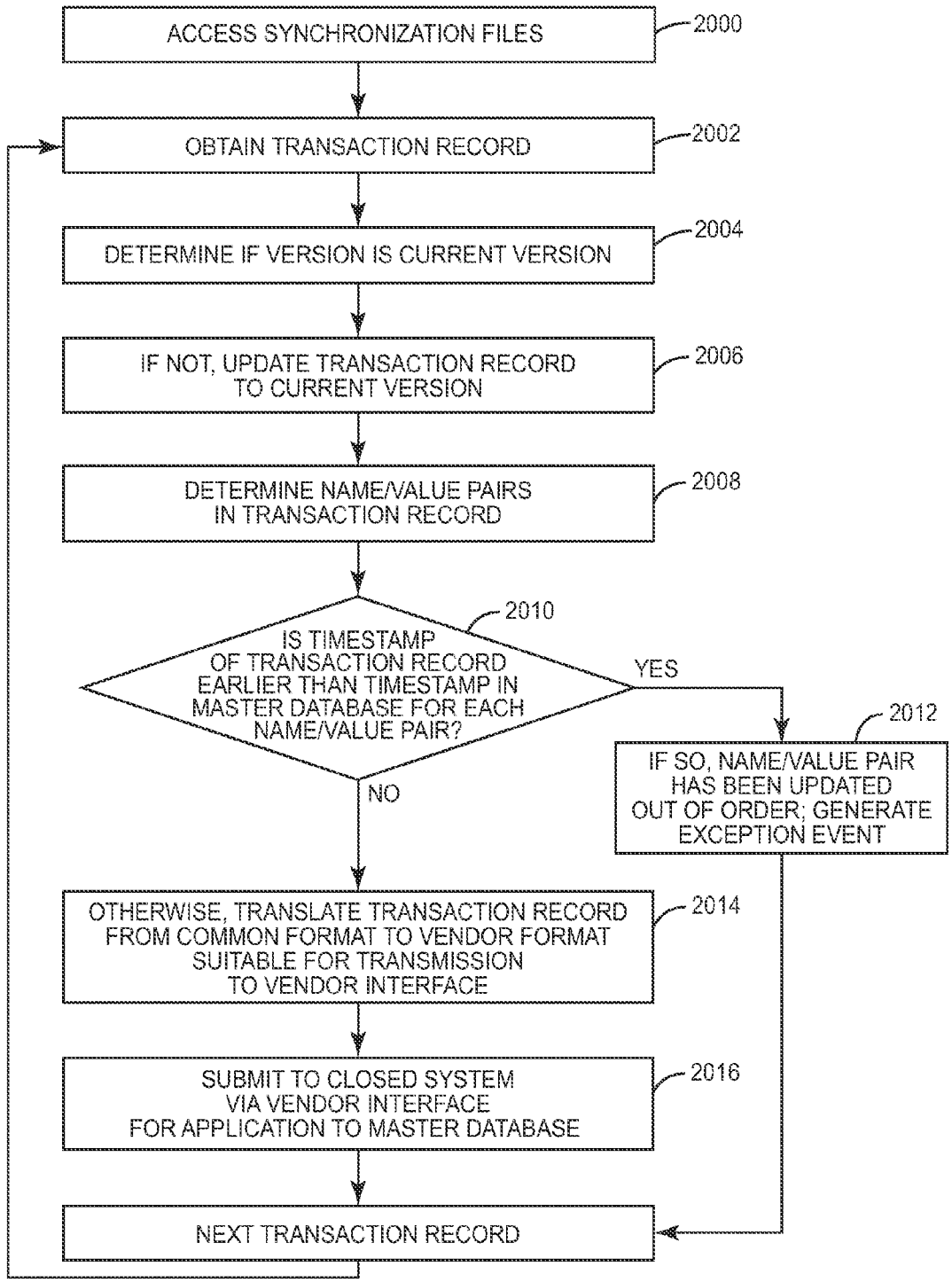
FIG. 6 is a flowchart of an exemplary process that may be performed by a master computing device to effect synchronization with a plurality of client computing devices.

At a second point in time, designated T2 in FIG. 5, the synchronization files 100, 106, and 108 are provided to a master computing device 110 for application to the master closed system 96 to synchronize the master closed system 96 with the closed systems 82-86. FIG. 6 is a flowchart of an exemplary process that may be performed by the master computing device 110 to effect such synchronization, and will be discussed in conjunction with FIG. 5. Initially, a transaction synchronization function 112 executing on the master computing device 110 accesses the synchronization files 100, 106, 108 (FIG. 6, step 2000). The transaction synchronization function 112 obtains the transaction records from the synchronization files 100, 106, 108. As the transaction synchronization function 112 processes each transaction record, the transaction synchronization function 112 determines whether the common format version of the transaction record is the current format version, and if not, updates the transaction record to the current format version (FIG. 6, steps 2002-2006).

In one embodiment, the master database 94 maintains a data element timestamp for each data element in the master database 94 that identifies the time of the last update to such data element. The data elements correspond to name/value pairs. The transaction synchronization function 112 examines each name/value pair in the transaction record (FIG. 6, step 2008), and examines the timestamp of the transaction record. The transaction synchronization function 112 compares the timestamp of the transaction record to the timestamps of the data elements from the master database 94 that correspond to the name/value pairs in the transaction record (FIG. 6, step 2010). If the timestamp of the transaction record is earlier than any such data element timestamp, then this may be an indication that a transaction record contained in a different synchronization file had already been applied to the master closed system 96, in essence out of order. In such event, the transaction synchronization function 112 may generate an exception event that identifies the transaction record so that the transaction record can subsequently be examined and a determination can be made about whether or not to apply the transaction record to the master closed system 96 (FIG. 6, step 2012). If the timestamp of the transaction record is later than the timestamps of the affected data elements of the master database 94, then the transaction synchronization function 112 translates data stored in the transaction record into a format suitable for submission to the master closed system 96 in accordance with the vendor interface of the master closed system 96 (FIG. 6, step 2014). The transaction synchronization function 112 then submits the translated transaction to the master closed system 96 for application to the master database 94 (FIG. 6, step 2016). During the processing of user transactions, the transaction synchronization function 112 may make a number of determinations to ensure that consistency of the closed system 96 is maintained. For example, in one embodiment, the transaction synchronization function 112 examines the CURR XACTION ID field 54 and PREV XACTION ID field 56 of each transaction record to ensure that transaction records are not missing. If a transaction record is missing, the transaction synchronization function 112 may generate an exception event.

Note that the use of data element timestamps allows for "out of order" transactions to be applied to the master closed system 96, so long as such transactions do not cause an out-of-order update to any particular data element in the master database 94. For example, assume that a first transaction record in a first synchronization file is created at time T3, and contains a single update to a first name/value pair. Assume that a second transaction record in a second synchronization file is created at time T4, and contains a single update to a second name/value pair. Assume that time T4 is later than time T3. Assume next that the second transaction record is submitted to the master closed system 96 before the first transaction record is submitted to the master closed system 96, and the data element that corresponds to the second name/value pair is updated. Such a scenario may occur simply because the second synchronization file was provided to the master computing device 110 before the first synchronization file was provided to the master computing device 110. Assume that the first transaction record is then processed. Although the timestamp of the data element that corresponds to the second name/value pair is later than the timestamp associated with the first transaction record, so long as the timestamp associated with the data element that corresponds to the first name/value pair is earlier than the time T3, the first transaction record may be submitted to the master closed system 96 without causing concern about an out-of-order update to the data. The first transaction record will only update the data element associated with the first name/value pair, and will not affect the data element associated with the second name/value pair.

Synchronization at the public access layer provides many advantages over synchronization at the data access layer. First, synchronization at the data access layer requires access to source code of the closed system, as well as extensive knowledge of the closed system, to ensure that modifications to the closed system to implement synchronization do not disrupt other functionality of the closed system. In contrast, synchronization at the public access layer eliminates the need for access to source code of the closed system, or knowledge of the underlying closed system. Moreover, synchronization at the public access layer eliminates the need to directly interact with the native database interfaces associated with closed systems. Moreover, complex closed systems typically include workflow processing wherein a single update to the closed system may result in multiple different database structure updates, as well as the generation of events, such as a work process order, a supply chain order, and the like. Synchronization at the public access layer eliminates the need to understand the way in which the closed system implements such workflow processing, and eliminates the likelihood that a modification to the closed system may accidentally disrupt such workflow processing.

Synchronization at the public access layer also eliminates or substantially reduces difficulties that may otherwise arise when closed system vendors release updates to products. If synchronization is performed at the data access layer, each such product update may potentially impact the synchronization process. Synchronizing at the public access layer eliminates this problem, because the underlying processing of the closed system is relatively independent of the synchronization process.

Figure 7:
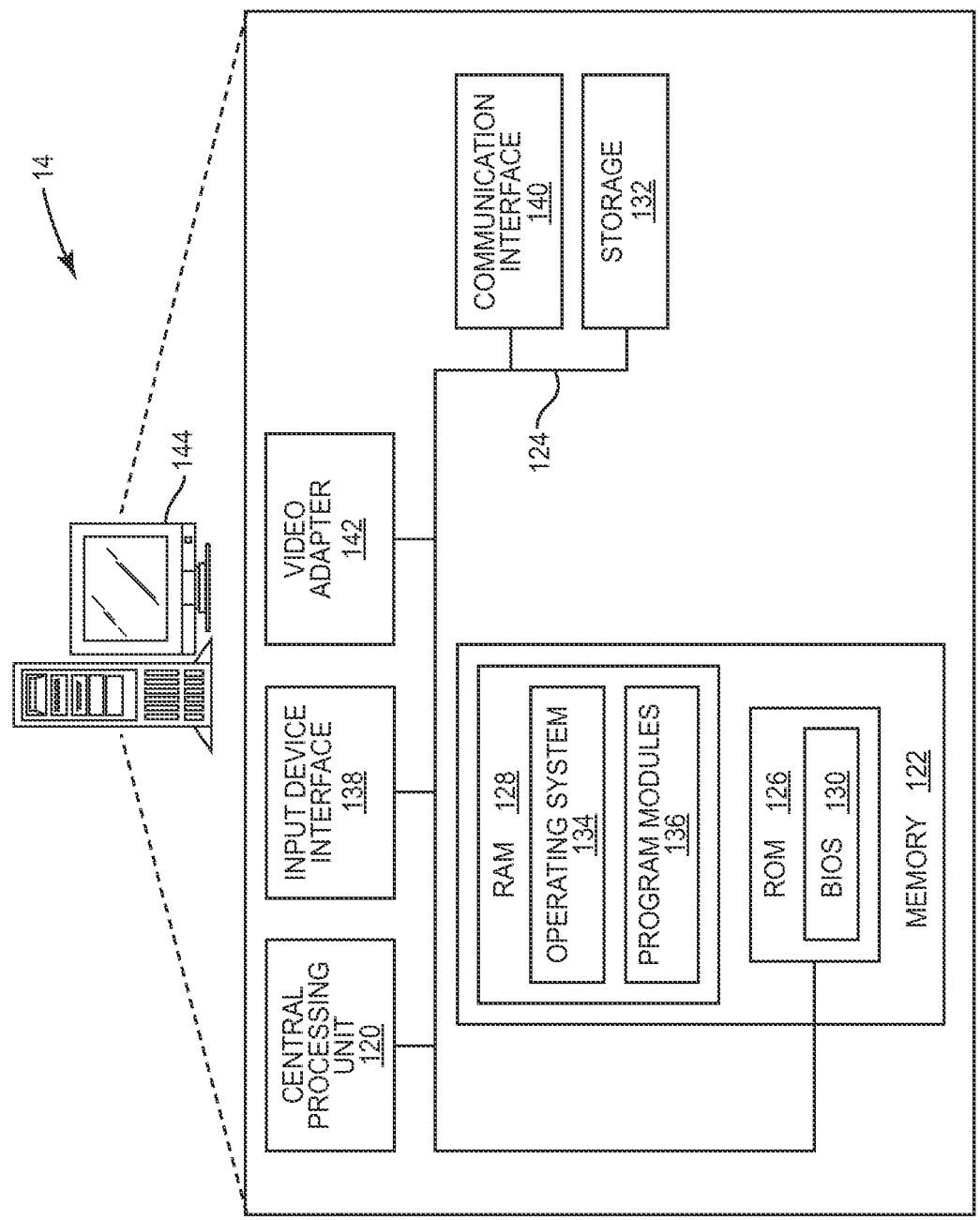
FIG. 7 is a block diagram of a computing device according to one embodiment.

FIG. 7 is a block diagram of an exemplary computing device 14 suitable for implementing any of the computing devices discussed herein, according to one embodiment. The computing device 14 may comprise any device capable of executing one or more functions that implement the functionality described herein, and may include, for example, a desktop or laptop computer, a computing tablet, or a smartphone. The computing device 14 includes a processor, such as a central processing unit 120; a system memory 122; and a system bus 124. The system bus 124 provides an interface for system components including, but not limited to, the system memory 122 and the central processing unit 120. The central processing unit 120 can be any of various commercially available or proprietary processors. Dual microprocessors and other multi-processor architectures may also be employed as the central processing unit 120.

The system bus 124 may be any of several types of bus structures that may further interconnect to a memory bus (with or without a memory controller), a peripheral bus, and/or a local bus using any of a variety of commercially available bus architectures. The system memory 122 may include non-volatile memory 126 (e.g., read only memory (ROM), erasable programmable read only memory (EPROM), electrically erasable programmable read only memory (EEPROM), etc.) and/or volatile memory 128 (e.g., random access memory (RAM)). A basic input/output system (BIOS) 130 may be stored in the non-volatile memory 126, and can include the basic routines that help to transfer information between elements within the computing device 14. The volatile memory 128 may also include a high-speed RAM such as static RAM for caching data.

The computing device 14 may further include a computer-readable storage 132, which may comprise, for example, an internal hard disk drive (HDD) (e.g., enhanced integrated drive electronics (EIDE) or serial advanced technology attachment (SATA)) HDD (e.g., EIDE or SATA) for storage, flash memory, or the like. The storage 132 may store, for example, the first database 18 and synchronization file 24. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the computer-readable storage 132 and in the volatile memory 128, including an operating system 134 and one or more program modules 136, which may implement the functionality described herein in whole or in part, including, for example, functionality described with respect to the first transaction synchronization function 20, first closed system 16, and other processing and functionality described herein. It is to be appreciated that the embodiments can be implemented with various commercially available operating systems 134 or combinations of operating systems 134.

All or a portion of the embodiments may be implemented as a computer program product stored on a non-transitory computer-usable or computer-readable medium, such as the storage 132, and including instructions configured to cause the central processing unit 120 to carry out the steps described herein. Thus, the computer-readable program code can comprise software instructions for implementing the functionality of the embodiments described herein when executed on the central processing unit 120. The central processing unit 120, in conjunction with the program modules 136 in the volatile memory 128, may serve as a control system for the computing device 14 that is configured to, or adapted to, implement the functionality described herein.

The user 12 may be able to enter commands and information into the computing device 14 through one or more input devices, such as, for example, a keyboard (not illustrated); a pointing device, such as a mouse (not illustrated); or a touch-sensitive surface. Other input devices may include a microphone, an infrared (IR) remote control, a joystick, a game pad, a stylus pen, or the like. These and other input devices may be connected to the central processing unit 120 through an input device interface 138 that is coupled to the system bus 124, but can be connected by other interfaces such as a parallel port, an IEEE 1394 serial port, a Universal Serial Bus (USB) port, an IR interface, etc.

The computing device 14 may also include a communication interface 140 for communicating with a network, which may comprise, for example, a wired or wireless network interface. The computing device 14 also preferably includes a video adapter 142 that interfaces with a display 144 that provides information to the user 12.

Those skilled in the art will recognize improvements and modifications to the preferred embodiments of the present disclosure. All such improvements and modifications are considered within the scope of the concepts disclosed herein and the claims that follow.

What is claimed is:

1. A method for synchronizing first and second closed systems with a third closed system, each of the first and second closed systems including corresponding first and second vendor interfaces, first and second native database interfaces, and first and second databases, and configured to submit transactions received via the corresponding vendor interfaces to the corresponding native database interfaces for application to the corresponding first and second databases, the method comprising:

accessing, by a transaction synchronization function on a computing device, a first synchronization file identifying a first plurality of transactions that are formatted in a common format and that were submitted to the first closed system, and a second synchronization file identifying a second plurality of transactions that are formatted in the common format and that were submitted to the second closed system;

accessing a transaction timestamp from a transaction of the first plurality of transactions, the transaction comprising a plurality of name and value pairs that correspond to respective data elements;

obtaining a time of last update associated with each respective data element from a master database;

determining that the transaction timestamp identifies a subsequent time other than the time of last update for each respective data element;

translating each of the first plurality of transactions and the second plurality of transactions from the common format to a vendor format in accordance with a third vendor interface; and submitting each of the translated first plurality of transactions and the translated second plurality of transactions to the third closed system via the third vendor interface for application to a third database to synchronize the third database with the first database and the second database.

2. The method of claim 1, wherein the third vendor interface differs from the first vendor interface and the second vendor interface.

3. The method of claim 1, wherein the third vendor interface is a same interface as the first vendor interface and the second vendor interface.

4. The method of claim 1, further comprising:
obtaining, from the first synchronization file, a first common format version of the first synchronization file;
determining that the first common format version is different from a current common format version; and
translating the first plurality of transactions from the first common format version to the current common format version prior to translating the first plurality of transactions to the vendor format in accordance with the third vendor interface.

5. A computer program product for synchronizing a first closed system with a second closed system, the first closed system including a first vendor interface, a native database interface, and a first database, the first closed system configured to submit a transaction received via the first vendor interface to the native database interface for application to the first database, the computer program product stored on a non-transitory computer-readable storage medium and including instructions configured to cause a processor to carry out the steps of:
receiving a first plurality of user transactions, each user transaction identifying a respective user action and data that identifies an intended modification to the first database;
generating a corresponding first plurality of transaction records based on the first plurality of user transactions, the first plurality of transaction records having a common format, each transaction record comprising at least one name and value pair, the name identifying a data item and the value identifying the value to be assigned to the data item, the at least one name and value pair mapping to respective fields in the first closed system and the second closed system;
storing the first plurality of user transactions in a first synchronization file, the first synchronization file including a common format version field that identifies a common format version of the common format;
submitting the first plurality of user transactions to the first closed system via the first vendor interface for application to the first database;
accessing a second synchronization file, the second synchronization file comprising a second plurality of transaction records in the common format that were submitted to the second closed system;
accessing a transaction timestamp from a transaction of the second plurality of transactions, the transaction comprising a plurality of name and value pairs that correspond to respective data elements;
obtaining a time of last update associated with each respective data element from a master database;
determining that the transaction timestamp identifies a subsequent time other than the time of last update for each respective data element; and
submitting each of the second plurality of transaction records from the second synchronization file to the first closed system via the first vendor interface for application to the first database.

6. The computer program product of claim 5, wherein each of the first plurality of transaction records comprises only name and value pairs for data fields that are altered by the corresponding user transaction.

7. A method for synchronizing a first closed system with a second closed system, the first closed system including a first vendor interface, a native database interface, and a first database, the first closed system configured to submit a transaction received via the first vendor interface to the native database interface for application to the first database, the method comprising:
receiving, at a first transaction synchronization function on a first computing device, a first plurality of user transactions, each user transaction identifying a respective user action and data that identifies an intended modification to the first database;
generating, by the first transaction synchronization function, a corresponding first plurality of transaction records based on the first plurality of user transactions, the first plurality of transaction records having a common format, each transaction record comprising at least one name and value pair, the name identifying a data item and the value identifying the value to be assigned to the data item, the at least one name and value pair mapping to respective fields in the first closed system and the second closed system;
storing, by the first transaction synchronization function, the first plurality of transaction records in a first synchronization file, the first synchronization file including a common format version field that identifies a common format version of the common format;
submitting, by the first transaction synchronization function, the first plurality of user transactions to the first closed system via the first vendor interface for application to the first database;
accessing, by the first transaction synchronization function, a second synchronization file, the second synchronization file comprising a second plurality of transaction records in the common format that were submitted to the second closed system;
accessing, by the first transaction synchronization function, a transaction timestamp from a transaction of the second plurality of transactions, the transaction comprising a plurality of name and value pairs that correspond to respective data elements;
obtaining, by the first transaction synchronization function, a time of last update associated with each respective data element from a master database;
determining, by the first transaction synchronization function, that the transaction timestamp identifies a subsequent time other than the time of last update for each respective data element; and
submitting, by the first transaction synchronization function, each of the second plurality of transaction records from the second synchronization file to the first closed system via the first vendor interface for application to the first database.

8. The method of claim 7, wherein each of the first plurality of transaction records comprises only name and value pairs for data fields that are altered by the corresponding user transaction.

9. An apparatus for synchronizing a first closed system with a second closed system, the first closed system including a first vendor interface, a native database interface, and a first database, the first closed system configured to submit a transaction received via the first vendor interface to the native database interface for application to the first database, comprising:
- a communication interface; and
- a control system comprising a processor coupled to the communication interface, and configured to:
  - receive, at a first transaction synchronization function, a first plurality of user transactions, each user transaction identifying a respective user action and data that identifies an intended modification to the first database;
  - generate, by the first transaction synchronization function, a corresponding first plurality of transaction records based on the first plurality of user transactions, the first plurality of transaction records having a common format, each transaction record comprising at least one name and value pair, the name identifying a data item and the value identifying the value to be assigned to the data item, the at least one name and value pair mapping to respective fields in the first closed system and the second closed system;
  - store, by the first transaction synchronization function, the first plurality of transaction records in a first synchronization file, the first synchronization file including a common format version field that identifies a common format version of the common format;
  - submit, by the first transaction synchronization function, the first plurality of user transactions to the first closed system via the first vendor interface for application to the first database
  - accessing, by the first transaction synchronization function, a second synchronization file, the second synchronization file comprising a second plurality of transaction records in the common format that were submitted to the second closed system;
  - accessing, by the first transaction synchronization function, a transaction timestamp from a transaction of the second plurality of transactions, the transaction comprising a plurality of name and value pairs that correspond to respective data elements;
  - obtaining, by the first transaction synchronization function, a time of last update associated with each respective data element from a master database;
  - determining, by the first transaction synchronization function, that the transaction timestamp identifies a subsequent time other than the time of last update for each respective data element; and
  - submitting, by the first transaction synchronization function, each of the second plurality of transaction records from the second synchronization file to the first closed system via the first vendor interface for application to the first database.

10. The apparatus of claim 9, wherein each of the first plurality of transaction records comprises only name and value pairs for data fields that are altered by the corresponding user transaction.

* * * * *